F. TWYMAN.
ANNEALING AND APPARATUS USED THEREIN.
APPLICATION FILED MAR. 5, 1918.
1,324,418.
Patented Dec. 9, 1919.
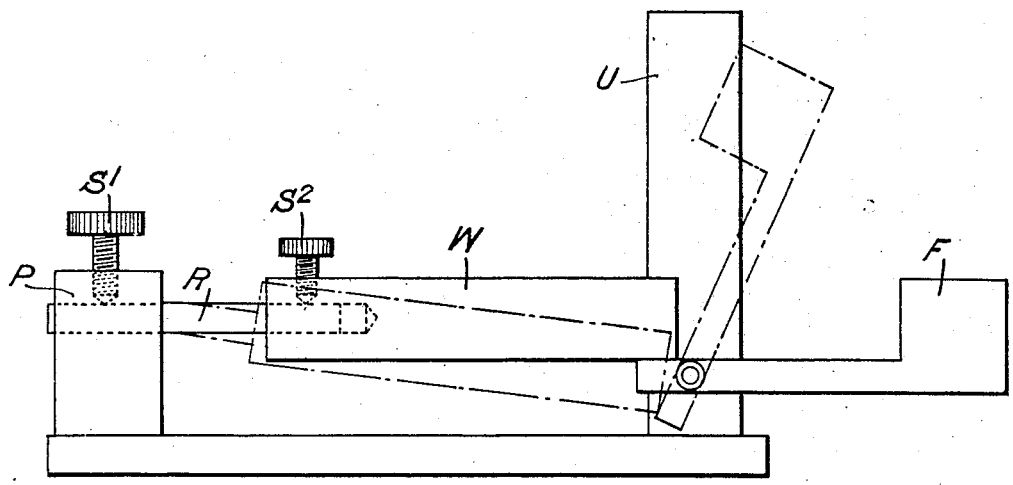
Inventor
Frank Twyman
By his Attorneys
Baldwin Wright

UNITED STATES PATENT OFFICE.

FRANK TWYMAN, OF LONDON, ENGLAND, ASSIGNOR TO ADAM HILGER, LIMITED, LONDON, ENGLAND.

ANNEALING AND APPARATUS USED THEREIN.

1,324,418.  Specification of Letters Patent.  Patented Dec. 9, 1919.

Application filed March 5, 1918.  Serial No. 220,478.

*To all whom it may concern:*

Be it known that I, FRANK TWYMAN, a subject of the King of Great Britain, residing at 75ᵃ Camden road, London, England, have invented a new and useful Improvement in Annealing and Apparatus Used Therein, of which the following is a specification.

This invention relates to improvements in the annealing of certain substances, which, at high temperatures, may be regarded as acting like viscous liquids; for instance, glass, porcelain and some metals. The invention also relates to apparatus suitable for use in the annealing process.

The invention is based upon a study of viscosity which has led to the conclusion that there is a relation between the disappearance of strain in a viscous substance and the deformation of the same substance under constant stress.

According to this invention I employ a rod of the same substance as that which is to be annealed, which rod is maintained under stress and is adapted to indicate the completion or progress of the annealing process. A sample of the substance or material of which the articles to be annealed are made is formed into a rod and one end of the rod is inserted into a hole in a pillar and secured in the hole by means of a screw and to the other end of the rod is fixed a weight. The pillar, screw and weight may be constructed of nickel or nichrome. The apparatus is placed in the annealing leer together with the articles to be annealed. As the temperature rises the weight begins to sink, and when it has sunk a certain distance it is known that the annealing process has reached a predetermined stage, or is completed. It may be arranged that the weight gives a signal at a predetermined stage of the process, or on the completion of the process, which signal may be the raising of a flag.

The length and section of the rod which, to secure any desired degree of annealing, will give any desired deflection of the end of a weight of a given length is found from the formula:—

$$\frac{DI}{1LM} = \frac{\log\left(\frac{S}{S_0}\right)}{E \log e}$$

where

M is the mean bending moment applied to the rod,

I is the amount of inertia of the area of the section of the rod, 1 is the exposed length of the rod, L is the length of the weight which is attached horizontally to the end of the rod, D is the linear deflection of the end of the weight, E is the coefficient of elasticity, S is the stress at any point in the substance after annealing and $S_0$ is the initial stress at the same point so that the ratio of $\frac{S}{S_0}$ is an expression of the degree of annealing.

In the case of glass, the rod may conveniently be of circular section having a diameter of .25 centimeters and an exposed length of 2.5 centimeters, and the weight should cause a compression at the bottom of the rod and a tension at the top of 570 kilograms per square centimeter.

When working this process it is not necessary to know the temperature at which the process is being conducted, and therefore it can be successfully carried out without the necessity of ascertaining the temperature.

The annexed drawing illustrates an apparatus made in accordance with this invention.

A rod R made of the same substance as that to be annealed and of the dimensions indicated above, is inserted into a hole in a pillar P where it is firmly held by means of a screw $S^1$. A weight W is fixed to the other end of the rod R by means of a screw $S^2$. The apparatus is placed in the leer, and as the temperature rises the weight W descends, raising a pivoted rod carrying a flag F, so that when the process is completed the flag overlaps the upright U.

It will be observed that inasmuch as the rod is made of the same substance as that to be annealed, it is not necessary to ascertain in advance the annealing temperature of the substance to be annealed.

What I claim is:—

1. The method hereinbefore described of indicating the progress of an annealing operation, which consists in subjecting to the annealing heat a rod of the same substance as that to be annealed, and in maintaining said rod under stress during the process.

2. Apparatus for indicating the progress of an annealing process, comprising a rod of the substance to be annealed, which rod is maintained under stress during the process.

3. Apparatus for indicating the progress of the process of annealing, comprising a rod of the same substance as that to be annealed, means for holding one end of the rod, and a weight fixed to the other end of the rod, which weight is such that the rod bends as the annealing operation progresses.

4. Apparatus for indicating the progress of the process of annealing, comprising a rod of the same substance as that to be annealed, means for holding one end of the rod, and a weight fixed to the rod, which is such that the rod bends as the annealing operation progresses and bends to a predetermined extent when the annealing operation is completed.

5. Apparatus for indicating the progress of the process of annealing, consisting of a rod of the substance to be annealed, a pillar having a hole in it, means for securing one end of the rod in the hole, a weight fixed to the other end of the rod, and a pivoted rod adapted to be engaged by the weight and actuated by said weight upon its descent.

6. The method hereinbefore described of indicating the progress of an annealing process by a rod of the same substance as that to be annealed, which is held under stress during the process.

7. The method hereinbefore described of indicating the progress of an annealing process by the deflection of a rod of the same substance as that to be annealed, which is maintained under stress during the process.

8. The method hereinbefore described of indicating the progress of an annealing process, which consists in subjecting a rod of the substance to be annealed to heat, maintaining the rod under stress while being heated, and in indicating by the deflection of the rod the progress of the annealing process.

9. The method hereinbefore described of indicating the progress of an annealing process, which consists in subjecting to heat a rod of the substance to be annealed, which is of such section, length and stress that its deflection under the annealing heat will indicate the progress of the annealing process.

10. Apparatus for indicating the progress of the process of annealing, comprising a rod of the same substance as that to be annealed, means for holding one end of the rod, and a weight adjustably secured to the opposite end of the rod.

11. Apparatus for indicating the progress of an annealing process, comprising a rod of the substance to be annealed of determined section, length and stress, means for holding one end of the rod, a weight carried by the opposite end of the rod, and signaling devices actuated by the weight.

In testimony that I claim the foregoing as my invention, I have signed my name this 27th day of December, 1917.

FRANK TWYMAN.